United States Patent [19]

Getts

[11] 4,379,362
[45] * Apr. 12, 1983

[54] MOTION CONVERSION MECHANISM

[76] Inventor: Sidney A. Getts, 1923 N. Church St., Rockford, Ill. 61103

[*] Notice: The portion of the term of this patent subsequent to Mar. 17, 1998, has been disclaimed.

[21] Appl. No.: 231,744

[22] Filed: Feb. 5, 1981

Related U.S. Application Data

[63] Continuation-in-part of Ser. No. 49,427, Jun. 18, 1979, Pat. No. 4,255,858.

[51] Int. Cl.³ .............................................. B27B 19/09
[52] U.S. Cl. ....................................... 30/393; 83/779
[58] Field of Search ............... 30/393, 272 R; 83/752, 83/753, 779

[56] References Cited

U.S. PATENT DOCUMENTS

| | | | |
|---|---|---|---|
| 2,137,893 | 11/1938 | Elder . | |
| 2,274,758 | 3/1942 | Wettlaufer et al. | 83/53 |
| 2,961,016 | 11/1960 | Papworth . | |
| 3,156,837 | 11/1964 | Weller et al. | 30/393 |
| 3,905,105 | 9/1975 | Tuke | 30/393 |
| 3,978,862 | 9/1976 | Morrison | 128/317 |
| 4,255,858 | 3/1981 | Getts | 30/393 |

FOREIGN PATENT DOCUMENTS 401489  3/1974  U.S.S.R. ................. 83/779

Primary Examiner—Jimmy C. Peters
Attorney, Agent, or Firm—Leydig, Voit, Osann, Mayer & Holt, Ltd.

[57] ABSTRACT

A mechanism for converting rotary motion to back and forth motion. The present mechanism is disclosed in conjunction with a jig saw having a blade mounted in a holder which is moved back and forth by a rotary eccentric. A stack of leaf springs is cantilevered on the frame of the saw and is attached rigidly to the holder to cause the blade to move in a substantially elliptical orbit.

10 Claims, 7 Drawing Figures

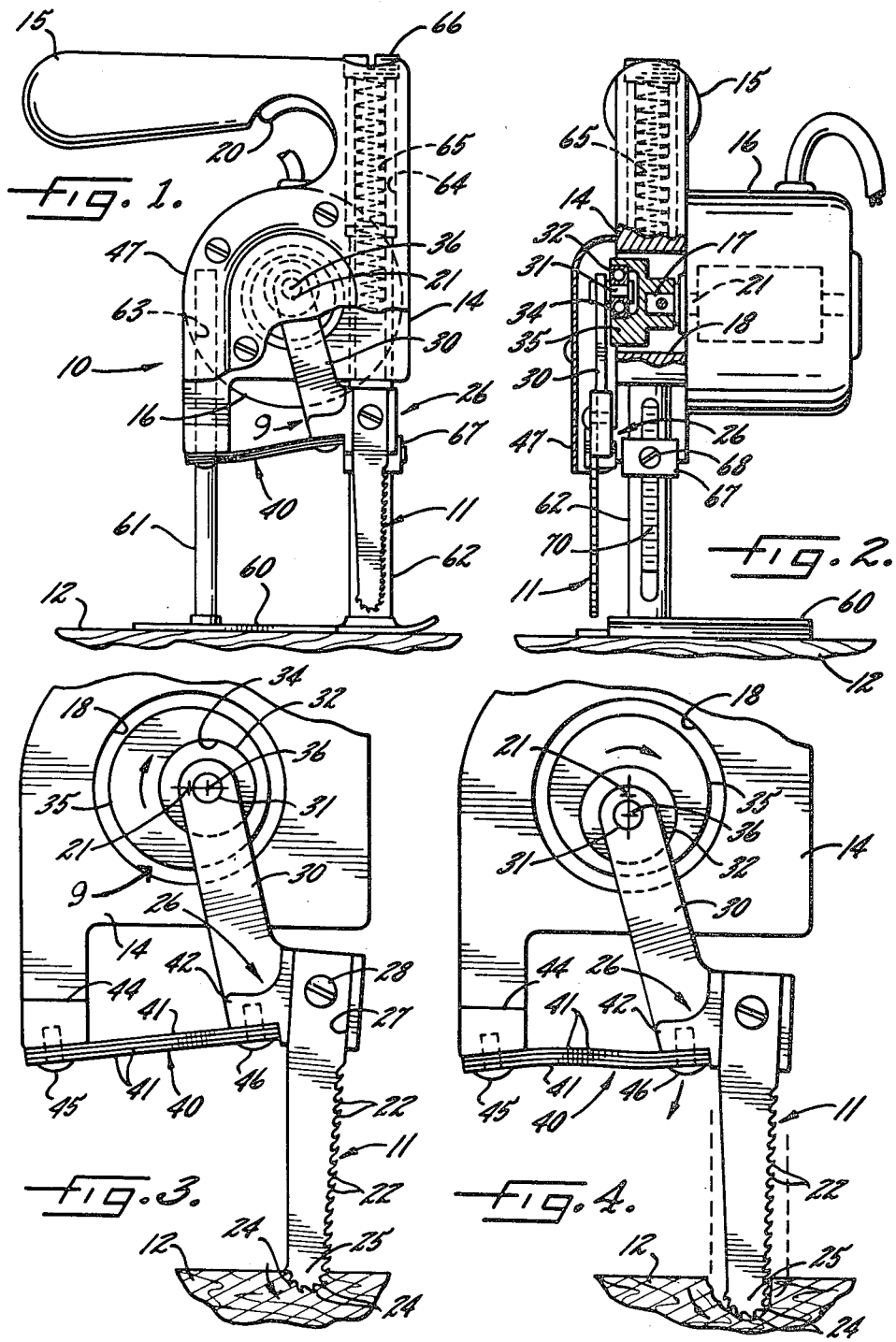

MOTION CONVERSION MECHANISM

CROSS REFERENCE TO A RELATED APPLICATION

This application is a continuation-in-part of my co-pending application Ser. No. 049,427, filed June 18, 1979 and entitled Jig Saw With Orbitally Movable Blade, now U.S. Pat. No. 4,255,858, granted Mar. 17, 1981.

BACKGROUND OF THE INVENTION

This invention relates generally to mechanism for producing back and forth motion and more particularly to mechanism for converting rotary motion of a driving member into back and forth motion of a driven member. The invention has even more specific reference to a mechanism in which the driven member travels in a generally elliptical orbit as it moves back and forth.

Various types of mechanisms for converting rotary motion to back and forth motion are well known and are frequently incorporated in power operated tools. In such an instance, the driving member is usually the rotary drive shaft of a motor while the driven member is formed by a work-performing tool. The tool may be a saw blade, a file, a sanding device, a shaper or the like. The driven member may take forms other than tools such as, for example, a reciprocating pawl for driving a ratchet.

In some cases, the driven member or tool is simply reciprocated back and forth with a straight line motion. In other cases, the tool advantageously is moved in a substantially elliptical orbit so that the tool traces different paths during its advance and return strokes. In a jig saw, for example, the saw blade may be moved in a substantially elliptical orbit so as to cause the teeth of the blade to cut into the work during one half of the stroke and to pull free of the work during the return stroke. Because the blade pulls free of the work during the return stroke, the teeth do not rub reversely against the work and, in addition, sawdust and waste chips are more effectively removed from the cut. By forming teeth around the tip of the orbitally movable blade, the blade can be used for plunge cutting as well as for conventional cutting.

As mentioned above, back and forth movement of the tool is often effected in response to rotation of a shaft. One extremely simple manner of converting the rotary motion of the shaft into back and forth motion of the tool is to connect the tool to an eccentric on the shaft and to constrain the tool for movement along a desired path.

SUMMARY OF THE INVENTION

The general aim of the present invention is to produce back and forth motion with a new and improved mechanism which is of relatively simple, inexpensive and trouble-free construction and which, at the same time, uniquely dampens vibration when the driven element is moved back and forth at high speed, produces better power transmission efficiency, and operates with low inertia, low noise, and low backlash.

A further object of the invention is to provide a mechanism which possesses the above characteristics and which converts rotary motion of a driving member into back and forth motion of a driven member while preferably causing the driven member to travel in a substantially elliptical path.

A more detailed object is to achieve the foregoing by providing a motion conversion mechanism in which a resiliently yieldable strap uniquely constrains the driven member for back and forth movement along a desired path while dampening vibration of the driven member, the strap preferably coacting with an eccentric and causing the motion of the eccentric to be transmitted to the driven member in an efficient manner.

The invention also resides in the provision of a motion conversion mechanism in which the resiliently yieldable strap is in the form of a stack of leaf springs which are stressed in a novel manner to assist in moving the driven member and to dampen vibration thereof.

These and other objects and advantages of the invention will become more apparent from the following detailed description when taken in conjunction with the accompanying drawings.

BRIEF DESCRIPTION OF THE DRAWINGS

FIG. 1 is a side elevational view of a new and improved motion conversion mechanism embodying the unique features of the present invention, the mechanism being illustrated as incorporated in a jig saw having certain parts broken away and shown in section.

FIG. 2 is a front elevational view, partly in cross-section, of the saw shown in FIG. 1.

FIG. 3 is an enlarged fragmentary view similar to FIG. 1 and shows certain parts of the saw in moved positions.

FIG. 4 is a view similar to FIG. 3 but shows parts of the saw in still further moved positions.

DETAILED DESCRIPTION OF THE PREFERRED EMBODIMENT

Figure 5:
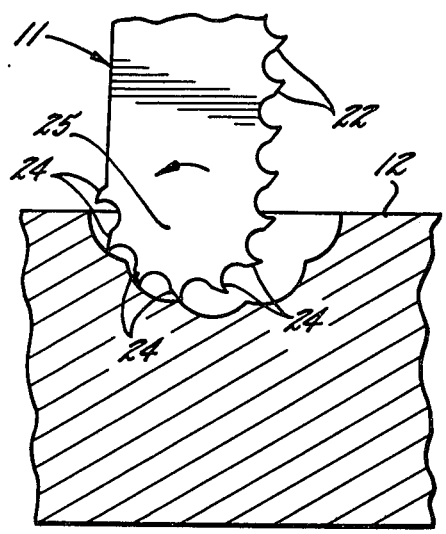
FIGS. 5 and 6 are enlarged side elevational views of the saw blade and show successive positions of the blade during a cutting operation.

The present invention is embodied in a mechanism 9 for producing back and forth motion and specifically for converting rotary motion into back and forth motion. The mechanism may be utilized in various types of apparatus but is particularly useful in power operated tools. In this particular instance, the tool which has been shown is a power driven saber saw or jig saw 10 having an elongated blade 11 adapted to be moved back and forth at high speeds to cut a workpiece 12. The saw includes a main support or frame plate 14 having a handle 15 which may be used to hold the saw. A variable speed electric motor 16 is attached to one side of the frame plate 14 and includes a rotary output shaft 17 (FIG. 2) which projects into an opening 18 in the frame plate. By squeezing a trigger 20 (FIG. 1) which is associated with the handle, the motor may be energized to rotate the shaft at a selected speed (e.g., a relatively high speed such as 10,000 RPM) and in a clockwise direction (FIG. 3) about the axis 21 of the shaft. The shaft 17 forms the driving member of the motion conversion mechanism 9 while, in this particular instance, the blade 11 constitutes the final driven member.

The blade 11 is made of metal and located in an upright position near the lower forward corner of the frame plate 14. Teeth 22 (FIG. 5) are formed along the forward edge of the blade and are raked so as to cut on the upstroke of the blade. Additional teeth 24 also are formed around the convexly curved tip 25 of the blade and are raked in a forward sense. The teeth 24 extend in an arcuate row around the tip with the uppermost tooth at the rear edge of the tip facing downwardly and with the uppermost tooth at the forward edge of the tip facing upwardly. As will be explained subsequently, the teeth 24 enable the blade 11 to be plunged downwardly into the workpiece 12 from the upper surface thereof.

As shown in FIG. 3, the blade 11 extends downwardly from a holder 26 and its upper end portion is received within an opensided slot 27 which is formed in the holder. A screw 28 extends through the upper end portion of the blade and is threaded into the holder to captivate the blade releasably in the slot.

The holder 26 is formed with an arm 30 which extends upwardly and rearwardly with respect to the upper end of the blade 11 adjacent the rear edge thereof. At its upper end portion, the arm 30 is advantageously secured to a pin 31 which is journaled within a bearing 32. The latter is secured within a cavity 34 formed in a flywheel 35 which is attached securely to the shaft 17 of the motor 16 so as to rotate with the shaft. The axis 36 (FIG. 3) of the pin 31 extends parallel to and is spaced radially from the axis 21 of the shaft 17 and thus the pin 31 defines an eccentric. The eccentric pin 31 turns about the axis 21 of the shaft 17 and is capable of turning within the bearing 32. As the shaft rotates, the eccentric pin causes the holder 26 and the blade 11 to move upwardly and downwardly. Being rigid with the blade 11, the holder 26 forms part of the driven member of the motion conversion mechanism 9.

In accordance with the present invention, the motion conversion mechanism 9 includes a resiliently yieldable strap 40 which is uniquely connected between the frame plate 14 and the driven member or holder 26. When the holder is moved upwardly and downwardly by the eccentric pin 31, the strap 40 constrains the holder and preferably causes the holder to oscillate forwardly and rearwardly so that the blade 11 undertakes a substantially elliptical motion. By virtue of its resiliency, the strap dampens vibration which tends to result from up and down movement of the blade, assists in moving the blade and enables the blade to be driven in a comparatively efficient manner and at relatively high speeds without hammering at the ends of its stroke. Moreover, the strap is secured to the frame plate 14 and the holder 26 in a manner which reduces noise while eliminating wear points and the need for lubrication. Accordingly, the saw 10 is comparatively durable and trouble-free in service use.

More specifically, the strap 40 is preferably but not necessarily formed by a stack of elongated leaf springs 41 (FIG. 3), there herein being three springs disposed in face-to-face relation. The springs extend transversely of the shaft 17 between a pad 42 on the lower rear corner of the holder 26 and a pad 44 on the lower rear corner of the frame plate 14 and are disposed in a plane which extends transversely of and is substantially perpendicular to the plane occupied by the blade 11. Being so disposed, the springs are capable of flexing upwardly and downwardly (i.e., toward and away from the shaft 17) as the blade is moved upwardly and downwardly. The springs, however, are substantially stiff endwise (i.e., left to right) and edgewise.

In carrying out the invention, the rear end portions of the springs 41 are cantilevered on and are attached rigidly to the pad 44 of the frame plate 14. For this purpose, a screw 45 (FIG. 3) extends through the rear end portions of the springs and is threaded into the pad. In addition, the forward end portions of the springs are preferably but not necessarily attached rigidly to the pad 42 of the holder 26. In the present instance, such attachment is effected by a screw 46 which extends through the forward end portions of the springs and which is threaded into the pad 42. By virtue of the ends of the springs being attached rigidly to the pads, no wear occurs at the attachment points and no lubrication is required. Since there is no wear or tolerances at the attachment points, there is virtually no backlash between the spring, the holder and the frame plate.

The opening 18, the holder 26 and the strap 40 may be covered by a shield 47 (FIG. 2) which is attached to the frame plate 14. The strap, however, need not necessarily be covered since sawdust and the like does not encumber effective operation of the strap.

When the shaft 17 is rotated in a clockwise direction, the eccentric 31 moves between top dead center and bottom dead center to produce downward and upward movement of the blade 11 and the holder 26. As the blade moves upwardly and downwardly, the springs 41 constrain movement of the holder and cause the holder to oscillate forwardly and rearwardly. This causes the blade to move in an orbit whose shape approximates that of an ellipse. The elliptical path is elongated in the vertical direction, is shallow in the horizontal direction and is much the same as the path which the blade would follow if the springs 41 were replaced by a link having its ends pivotally connected to the pads 42 and 44 to turn about horizontal axes.

Figure 6:
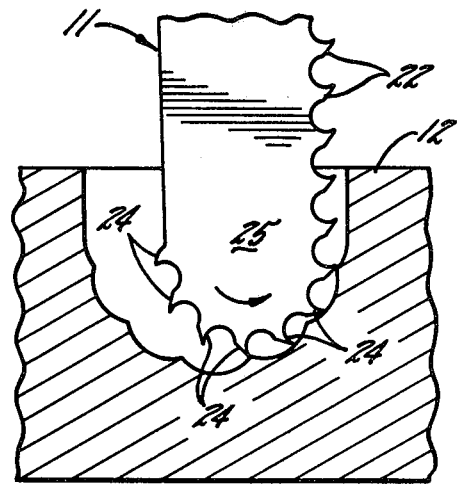

As the blade 11 is moved through its downstroke, its lower end portion swings rearwardly from the position shown in FIG. 1 to the position shown in FIG. 3. As the blade approaches the lower end of its downstroke, the tip 25 of the blade is oscillated forwardly or counterclockwise to cause the teeth 24 around the lower rear portion of the blade to cut into the workpiece 12 as shown in FIG. 5. When the blade completes its downstroke and starts through its upstroke, the teeth 22 on the forward edge of the blade cut the work and, in addition, the teeth 25 around the forward portion of the tip cut into the bottom of the slot being formed in the work (see FIG. 6). It should be noted that the teeth 24 cut during both the upstroke and the downstroke while the teeth 22 are in cutting contact with the work only during the upstroke. During the downstroke, the teeth 22 are swung rearwardly of engagement with the forward side of the cut. This avoids contact between the teeth and the work during the non-cutting stroke so as to reduce wear of the blade and to promote a better flow of sawdust and chips.

Figure 7:
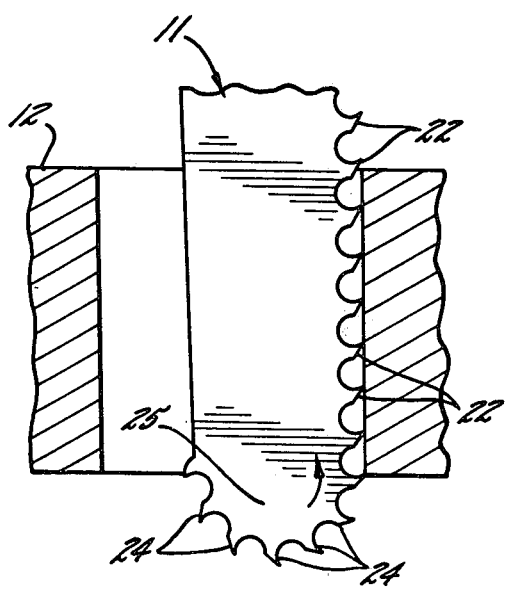
FIG. 7 is a view similar to FIG. 5 and further shows the cutting action of the blade.

The orbital motion enables the teeth 24 on the tip 25 of the blade 11 to be effectively plunged into the workpiece 12. Thus, slots and grooves of various shapes can be formed. FIG. 7 shows the blade cutting a slot in the workpiece.

To facilitate an understanding as to the manner in which the springs 41 dampen vibration and assist in the efficient transmission of power from the shaft 17 to the holder 26, let it be assumed that the eccentric pin 31 is approaching top dead center and is moving the blade 11 through its upstroke. As the eccentric pin approaches top dead center and the blade moves upwardly, the springs 41 are flexed into a generally S-shaped configuration as shown in FIG. 1 and are resiliently stressed or loaded. As a result, the springs absorb energy as the upwardly moving blade decelerates and comes to a stop. This cusions the stopping movement and avoids an abrupt shock load or hammering.

As the eccentric pin 31 starts around top dead center to move the blade 11 downwardly, the loaded springs relax and discharge their stored energy to urge the blade downwardly. The springs thus assist in causing the blade to accelerate.

When the blade 11 is moving downwardly and the eccentric pin 31 is approximately 90 degrees from top dead center, the springs assume a substantially straight condition as shown in FIG. 3. Then as the pin rotates toward bottom dead center, the springs are stressed reversely and flex to a substantially reverse S-shape as shown in FIG. 4. Such flexing again loads the springs so that the springs dampen deceleration of the blade and cushion shock as the blade comes to the stop at the bottom of its downstroke. As the blade starts upwardly, the springs again relax and discharge their stored energy to assist initial upward movement of the blade. The springs assume a substantially straight condition after the pin 31 has rotated approximately 90 degrees from bottom dead center and then flex to the shape shown in FIG. 1 as the pin approaches top dead center so as to dampen deceleration of the blade at the top of its upstroke.

Thus, the springs 41 are cyclically loaded and absorb energy as the blade 11 approaches the ends of its upstroke and downstroke and then discharge and impart energy to the blade as the latter begins to move through its downstroke and upstroke. Importantly, the springs not only absorb the vertical components of vibration but also dampen the other components. By virtue of their loading and unloading, the springs more evenly distribute the forces exerted on the blade as it moves back and forth. Accordingly, the springs enable the blade to be reciprocated efficiently at high speed, with low inertia and with very little vibration being imparted to the frame plate 14. Operator fatigue in running the saw is reduced because of the low vibration.

A stack of several springs 41 is preferred in order to avoid fatigue failures which could result if the strap 40 were formed by a single spring. Also, a stack of springs is more rigid in an endwise direction than is a single spring and thus the stack of springs more effectively confines the blade for movement in the desired orbit. By varying the number of springs, the strap 40 can be correlated or "tuned" with the optimum speed of the motor 16. Also, the path of the orbit may be varied by changing the attaching points 45 and 46 of the springs.

Means are provided for controlling the depth to which the blade 11 cuts and are selectively adjustable to enable cuts of different depths to be established. Herein, these means comprise a depth control foot 60 (FIGS. 1 and 2) which is in the form of a generally horizontal plate located beneath the frame plate 14. The foot 60 is located at the lower ends of a pair of posts 61 and 62 which are guided for up and down sliding within a pair of openings 63 and 64, respectively, in the frame plate 14. The post 62 is tubular and receives a coil spring 65 which is compressed between the lower end of the post 62 and a threaded plug 66 at the upper end of the opening 64. A collar 67 is telescoped over the lower end portion of the post 62 and is adjustably secured to that post by a screw 68. The collar 67 is located beneath the frame plate 14.

To establish the depth of cut, the collar 67 is adjusted to a desired vertical position along the post 62 and then is secured in that position by the screw 68. A calibrated scale 70 (FIG. 2) may be formed on the post 62 to facilitate positioning of the collar 67.

Once the collar 67 has been secured in the desired position, the frame plate 14 is simply moved downwardly and the blade 11 plunges into the workpiece 12 until the lower end of the frame plate contacts and is stopped by the collar. As long as the frame plate is manually pushed downwardly, the blade will saw at a constant depth determined by the position of the collar. When downward manual pressure is released from the frame plate, the spring 65 automatically returns the frame plate and the blade upwardly to the position shown in FIG. 1.

From the foregoing, it will be apparent that the present invention brings to the art a new and improved mechanism 9 for producing back and forth motion and specifically for converting the rotary motion of a shaft or driving member 17 into back and forth motion of a driven member 11, 26. The resiliently yieldable strap 40 formed by the springs 41 confines the driven member for back and forth motion, and specifically for back and forth orbital motion, while significantly dampening vibration which otherwise would occur during such movement. The springs result in power being transmitted to the driven member with relatively high efficiency, help reduce operator fatigue and enable the mechanism to operate in a relatively quiet manner. Since the springs do not have bearings, pivoted points or the like, the springs experience a long service life without lubrication and operate without any substantial backlash.

While the mechanism 9 has specifically been shown in the drawings in conjunction with a jig saw 10, it will be appreciated that the mechanism can be used with other tools or devices to produce back and forth motion. For example, the mechanism can be incorporated in a power driven shaper, sander, file, etc. or used for driving various other devices where back and forth or back and forth orbital motion is required.

I claim:

1. Mechanism for converting rotary motion to back and forth motion, said mechanism comprising a support, a power driven shaft mounted on said support to rotate about a predetermined axis, a driven member operably connected to said shaft, and means for causing said driven member to move back and forth in response to rotation of said shaft in one direction, said means comprising a resiliently yieldable strap connected between said support and said driven member and positioned to flex resiliently in the general direction of said back and forth motion thereby to dampen vibration of said driven member, said resiliently yieldable strap comprising a stack of leaf springs disposed in face-to-face relation, each of said springs having one end cantilevered on said support and having an opposite end connected to said driven member.

2. Mechanism as defined in claim 1 in which said driven member is moved back and forth along a predetermined path, said resiliently yieldable strap being positioned so as to be stressed in one direction when said driven member is at one end of said path and to be stressed in the reverse direction when said driven member is at the other end of said path.

3. Mechanism as defined in claim 2 in which said resiliently yieldable strap is positioned so as to flex toward and away from said shaft.

4. Mechanism as defined in claim 1 in which said means further comprises an eccentric rotatable with said shaft and having an axis spaced radially from and extending parallel to the axis of the shaft whereby the axis of the eccentric moves in an orbit around the axis of the shaft when the shaft is rotated, said driven member being connected to said eccentric and being turnable relative to the shaft about the axis of the eccentric.

5. Mechanism as defined in claim 4 in which said eccentric coacts with said strap to move said driven member back and forth along a predetermined path, said strap being positioned so as to be stressed in one direction when said driven member is at one end of said path and to be stressed in the reverse direction when said driven member is at the other end of said path.

6. Mechanism for producing back and forth motion, said mechanism comprising a support, a power operated driving member on said support, a driven member, means connecting said driven member to said driving member and operable to move said driven member back and forth along a predetermined path in response to operation of said driving member, and a resiliently yieldable strap extending between and connected to said support and said driven member and positioned to flex cyclically in the general direction of said path thereby to dampen vibration of said driven member while assisting said driving member in moving said driven member, said strap being located so as to be stressed in one direction when said driven member is at one end of said path and to be stressed in the reverse direction when the driven member is at the opposite end of the path, said resiliently yieldable strap comprising a stack of leaf springs disposed in face-to-face relation, each of said springs having one end cantilevered on said support and having an opposite end connected to said driven member.

7. Mechanism as defined in claim 6 in which said driving member comprises a shaft mounted on said support to rotate about an axis coinciding with the axis of the shaft, said connecting means comprising an eccentric rotatable with said shaft and having an axis spaced radially from and extending parallel to the axis of the shaft whereby the axis of the eccentric moves in an orbit around the axis of the shaft when the shaft is rotated, said driven member being connected to said eccentric and being turnable relative to the shaft about the axis of the eccentric.

8. Mechanism for converting rotary motion to back and forth motion, said mechanism comprising a support, a power driven shaft mounted on said support to rotate about a predetermined axis coinciding with the axis of the shaft, an eccentric rotatable with said shaft and having an axis spaced radially from and extending parallel to the axis of the shaft whereby the axis of the eccentric moves in a circular orbit around the axis of the shaft when the shaft is rotated, a driven member, means connecting said driven member to said eccentric and permitting said driven member to turn relative to said shaft about the axis of the eccentric, and a resiliently yieldable strap for causing said driven member to move back and forth in response to rotation of said eccentric in one direction, said strap being connected between said support and said driven member and being flexed cyclically by said driven member in the general direction of said back and forth motion thereby to resiliently dampen vibration of said driven member, said resiliently yieldable strap comprising a stack of leaf springs disposed in face-to-face relation, each of said springs having one end cantilevered on said support and having an opposite end connected to said driven member.

9. Mechanism as defined in claim 8 in which said driven member is moved back and forth along a predetermined path, said resiliently yieldable strap being positioned so as to be stressed in one direction when said driven member is at one end of said path and to be stressed in the reverse direction when said driven member is at the other end of said path.

10. Mechanism for converting rotary motion to back and forth substantially elliptical orbital motion, said mechanism comprising a support, a power driven shaft mounted on said support to rotate about a predetermined axis coinciding with the axis of the shaft, an eccentric rotatable with said shaft and having an axis spaced radially from and extending parallel to the axis of the shaft whereby the axis of the eccentric moves in an orbit around the axis of the shaft when the shaft is rotated, a driven member, means connecting said driven member to said eccentric and permitting said driven member to turn relative to said shaft about the axis of the eccentric, said eccentric being operable to move said driven member back and forth along a path extending transversely of the axis of said shaft when said shaft is rotated in one direction, a stack of resiliently yieldable elongated leaf springs disposed in face-to-face relation and connected between said driven member and said support to cause said driven member to travel in a substantially elliptical orbit as said driven member is moved back and forth by said eccentric, each of said springs extending transversely of the axis of said shaft and extending transversely of the path of said driven member, said springs being substantially stiff edgewise and being capable of flexing resiliently back and forth in the general direction of said path, and said springs being located so as to be stressed in one direction when said driven member is at one end of said path and to be stressed in the reverse direction when the driven member is at the other end of said path.

* * * * *